United States Patent [19]
Lafuze

[11] 3,873,928

[45] Mar. 25, 1975

[54] REFERENCE WAVE GENERATOR USING LOGIC CIRCUITRY FOR PROVIDING SUBSTANTIALLY SINUSOIDAL OUTPUT

[75] Inventor: David Logan Lafuze, Fairview, Pa.

[73] Assignee: General Electric Company, Wilmington, Mass.

[22] Filed: Mar. 8, 1972

[21] Appl. No.: 232,861

[52] U.S. Cl. .................... 328/14, 307/233, 328/39, 328/133

[51] Int. Cl. .................... H03d 13/00

[58] Field of Search .......... 328/14, 47, 133, 134, 39, 328/41, 58; 307/261, 233

[56] References Cited

UNITED STATES PATENTS

| | | | |
|---|---|---|---|
| 3,187,262 | 6/1965 | Crane | 328/133 |
| 3,219,938 | 11/1965 | Greening | 328/133 |
| 3,510,782 | 5/1970 | Ralph | 328/14 |
| 3,512,092 | 5/1970 | Thurnell | 328/14 |
| 3,564,425 | 2/1971 | Brok | 328/133 X |
| 3,579,081 | 5/1971 | Bates | 328/14 X |
| 3,579,117 | 5/1971 | Norris | 328/14 |
| 3,660,766 | 5/1972 | Hilliard | 328/14 |

*Primary Examiner*—Michael J. Lynch
*Assistant Examiner*—L. N. Anagnos

[57] ABSTRACT

In a reference wave generator, a clock source synchronizes first and second step wave generators respectively producing output waves of first and second frequencies. The step wave generators have their outputs connected to a discriminator which provides a reference wave output having a frequency equal to the difference of the frequencies of the step waves applied to its inputs. In order to improve the output wave shape, one of the step wave generators produces a quasi-square wave which comprises a square wave having zero dwell between its positive and negative values.

10 Claims, 11 Drawing Figures

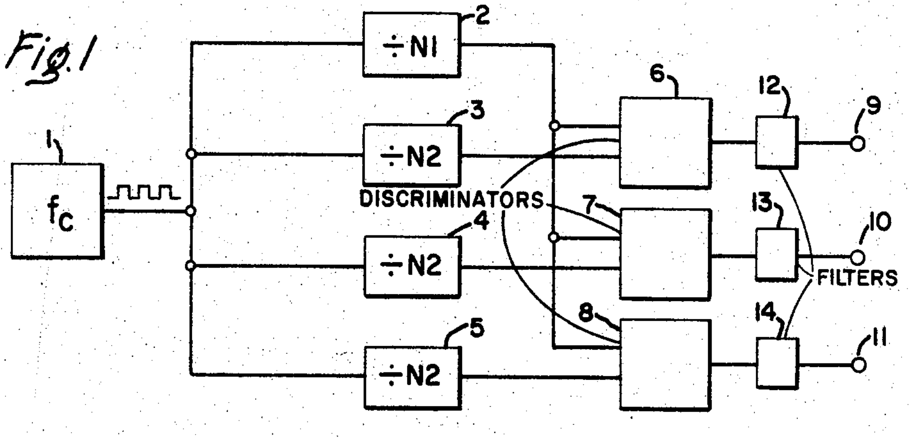
Fig.2
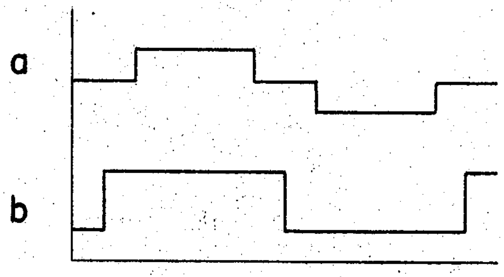
Fig.3
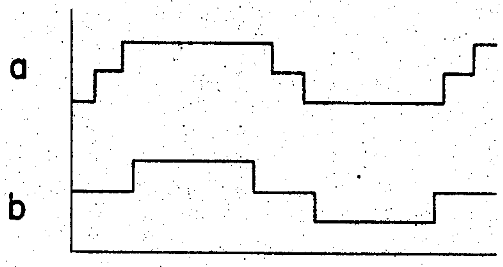
Fig.4
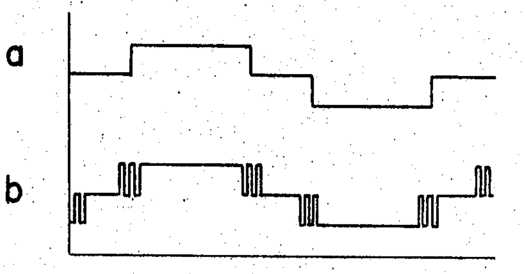
Fig.5
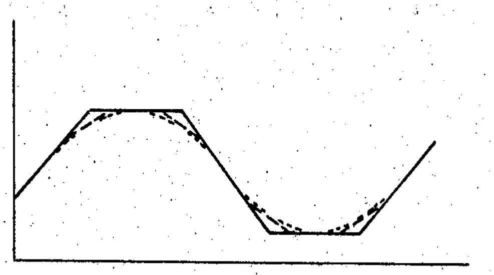

Fig. 6-I

| J-K FLIP-FLOP | | | |
|---|---|---|---|
| J | K | Q BEFORE CLOCK PULSE | Q AFTER CLOCK PULSE |
| 1 | 1 | 1 | 0 |
| 1 | 0 | 1 | 1 |
| 0 | 1 | 1 | 0 |
| 0 | 0 | 1 | 1 |
| 1 | 1 | 0 | 1 |
| 1 | 0 | 0 | 1 |
| 0 | 1 | 0 | 0 |
| 0 | 0 | 0 | 0 |

| NAND GATE | | |
|---|---|---|
| FIRST INPUT | SECOND INPUT | OUTPUT |
| 0 | 0 | 1 |
| 0 | 1 | 1 |
| 1 | 0 | 1 |
| 1 | 1 | 0 |

Fig. 6-II
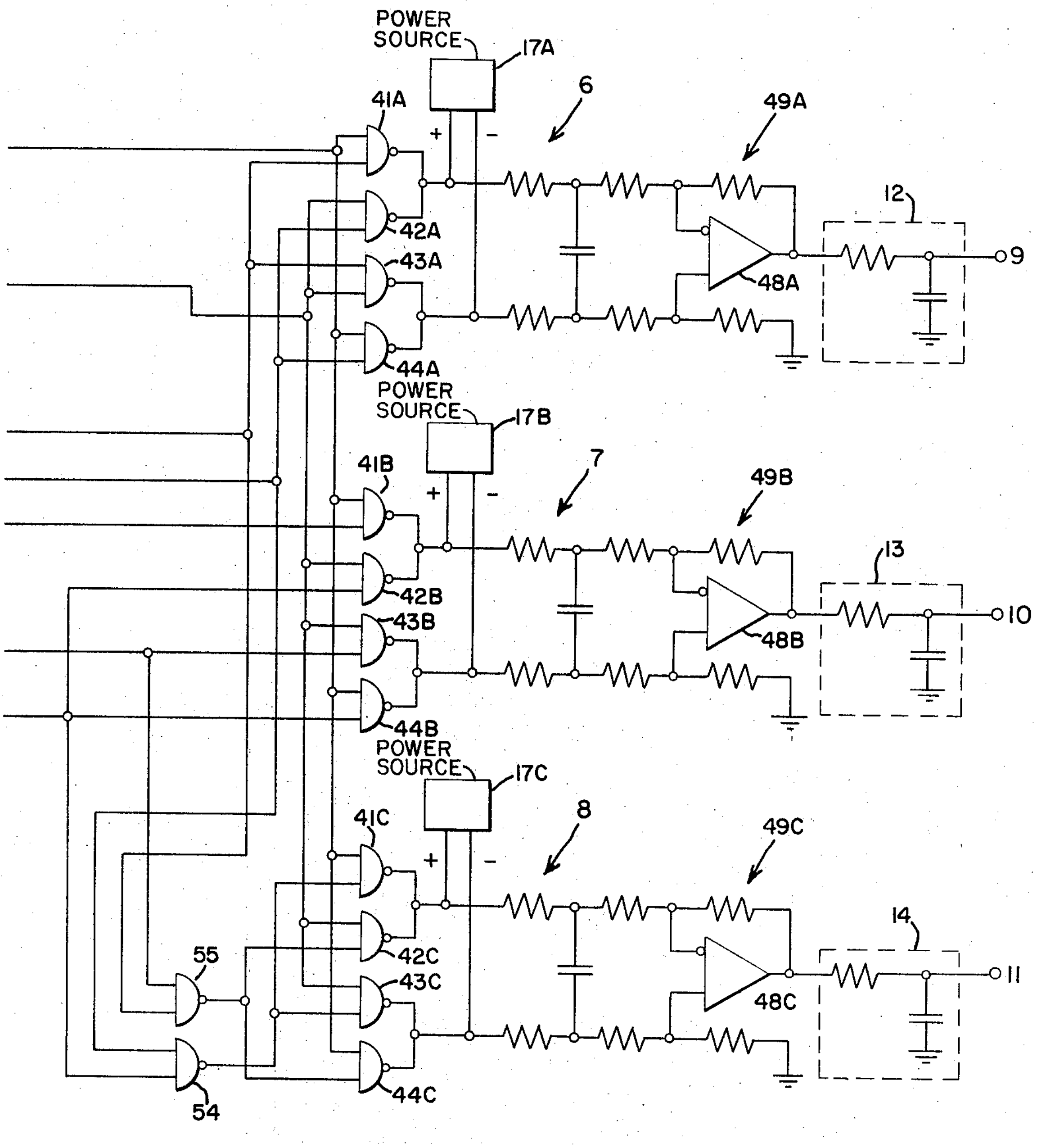

REFERENCE WAVE GENERATOR USING LOGIC CIRCUITRY FOR PROVIDING SUBSTANTIALLY SINUSOIDAL OUTPUT

BACKGROUND OF THE INVENTION

This invention relates to reference wave generators. More particularly, it relates to reference wave generators in which an output wave is produced in response to the difference between first and second input waves.

It is known that if two square waves of slightly different frequencies are passed through a discriminator circuit which gives an output voltage equal to the integral of in-phase voltage minus the out-of-phase voltage of the two wave forms, an output wave form is obtained having a triangular envelope. The frequency of this output wave is equal to the difference of the frequencies of the two square waves. By discriminating further square waves against the first square wave, a number of output wave forms of desired relative phase may be obtained. Commonly, in order to provide a three phase output wave, a first square wave is discriminated against second, third and fourth waves by first, second and third discriminators respectively. However, it is not desirable to operate most electrical devices on a source having a triangular wave form. Therefore, some wave shaping means are used. For example, a simple clipping circuit may be used to provide a trapezoidal output wave. Thus, additional wave shaping circuitry must be provided in a wave generator providing its output wave in the above-described manner. Further, inherent in the discriminator's operation is the generation of harmonics, or multiples of the desired output frequency. Further circuitry must be utilized to surpress harmonic generation.

The square waves are produced by step wave generators. In the context of this application, the term step wave generators means wave generators that produce wave forms having rectangular rather than sinusoidal or other curved shapes. Step wave generators are generally characterized by their implementation by logic circuitry such that amplitudes of the wave forms produced thereby increase and decrease in increments rather than continuously.

SUMMARY OF THE INVENTION

It is therefore an object of the present invention to provide an improved reference wave generator in which step wave generators are utilized to produce an output reference wave having a substantially sinusoidal wave form.

It is a more specific object of the present invention to provide a reference wave generator of the type described suitable for providing a multiphase output.

It is another object to provide a reference wave generator of the type described in which harmonic output is minimized.

Briefly stated, in accordance with the present invention there is provided in a reference wave generator, a clock source synchronizes first and second step wave generators respectively producing output waves of first and second frequencies. The step wave generators have their outputs connected to a discriminator which provides a reference wave output having a frequency equal to the difference of the frequencies of the step waves applied to its inputs. In order to improve the output wave shape, one of the step wave generators produces a quasi square wave which comprises a square wave having zero dwell between its positive and negative values.

BRIEF DESCRIPTION OF THE DRAWINGS

The circuitry through which the foregoing objects and features of novelty are embodied is pointed out with particularity in the claims forming the concluding portion of the specification. The invention, both as to its organization and manner of operation, may be further understood by reference to the following description taken into connection with the following drawings.

Of the drawings:

FIG. 1 is a block diagrammatic representation of the present invention:

FIG. 2, 3 and 4 are representations of input waveforms to the discriminator of the circuit of FIG. 1 in various embodiments of the present invention;

FIG. 5 is a representation of one phase of the output waveforms obtained in response to the input waveforms of FIGS. 2, 3 and 4;

FIGS. 6–I and 6–II, when combined as indicated thereon form FIG. 6 which is a schematic illustration of one form of the circuit of FIG. 1 while

DESCRIPTION OF THE PREFERRED EMBODIMENTS

Figures 6A, 6B:
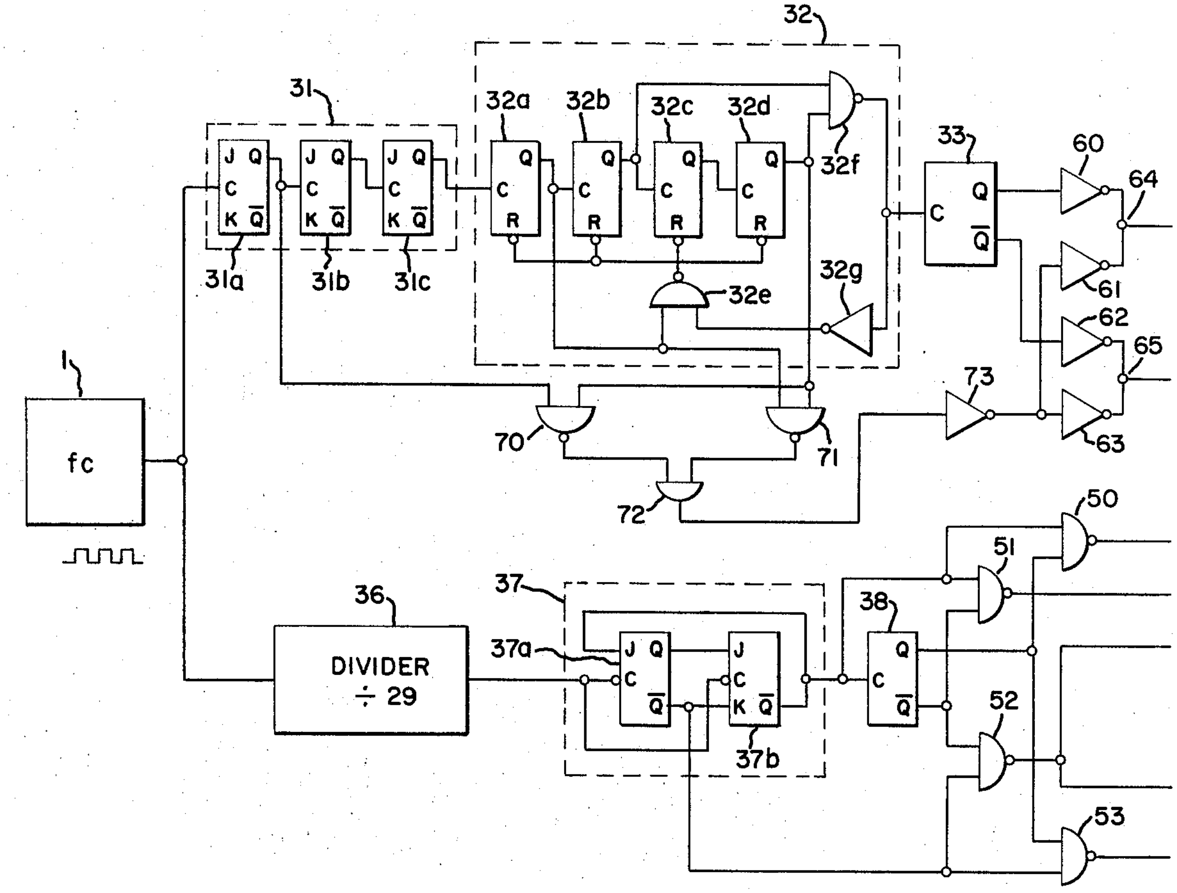
FIGS. 6*a* and 6*b* are truth tables illustrating the operation of certain components of the circuit of FIG. 6.

FIG. 1 is a block diagramatic representation of a reference wave generator constructed in accordance with the present invention. Schematic details of the circuit of FIG. 1 are illustrated in FIG. 6. A clock source 1 is connected to provide an input wave having a frequency *fc* to frequency dividers 2, 3, 4 and 5. The frequency divider 2 divides the frequency *fc* by a first divisor N1, and the frequency dividers 3, 4 and 5 divide the frequency *fc* by a second divisor N2. The output of the frequency divider 2 is connected to a first input of discriminators 6, 7 and 8, and the outputs of the frequency dividers 3, 4 and 5 are each respectively connected to a second input of the discriminators 6, 7 and 8. The discriminators 6, 7 and 8 respectively have output terminals 9, 10 and 11. For connection to utilization means (not shown) Filtering means 12, 13 and 14 may be respectively connected between the discriminators 5, 6 and 7 and the output terminals 9, 10 and 11.

The frequency dividers 2, 3, 4 and 5 may be viewed as means for dividing the clock frequency *fc*, or may be viewed as independent frequency sources which in this embodiment are synchronized by the clock source 1. Each of the frequency dividers 2, 3, 4 and 5 and the clock source 1 are digital, i.e., they provide step waveforms. The frequency dividers 4 and 5 operate to effectively shift the phase of inputs provided thereto such that a desired phase relationship may be provided between the outputs appeariing at the terminals 9, 10 and 11. In the present embodiment, the outputs at the terminals 9, 10 and 11 are displaced from each other by 120°. The discriminators 6,7 and 8 are well-known devices, each of which provides an output equal to the inphase voltage minus the out-of-phase voltage of the inputs applied thereto. Each of the discriminators 6, 7 and 8 further includes integrating means such that the outputs at the terminals 9, 10 and 11 consist of the integrated value of the in-phase voltage minus the out-of-phase voltage. In other words, if first and second square waves of differing frequencies are applied to the first and second inputs of a discriminator 6, 7 or 8, the waveform appearing at the output terminal 9, 10 or 11 is a triangular wave having a frequency equal to the difference of the frequencies of the two square waves. To provide the desired output frequency, a clock frequency *fc* is chosen, a first divisor N1 is selected for the frequency divider 2, and a second divisor N2 is selected for the frequency dividers 3, 4 and 5. Thus, for example, where it is desired to provide an output frequency *fo* of 400 Hz, and *fc* may be chosen of 6.125 MHz, N1 is selected to be 174 and an N2 of 176 is selected. Consequently, fo may be expressed as: fo = 6.125 MH (1/174 - 1/176) fi = 400 Hz As stated above, if first and second square waves are provided to the discriminators 6, 7 and 8, the output wave form obtained is triangular. In accordance with the present invention, other forms of step waves are utilized to provide improved output wave forms. The other forms of step waves utilized are discussed with respect to FIGS. 2–5, one form of circuitry for obtaining those step waves is illustrated in FIG. 6.

FIGS. 2*a*, 3*a* and 4*a* represent wave forms which may be applied to the first input of the discriminators 6, 7 and 8. FIGS. 2*b*, and 3*b* and 4*b* represent wave forms which may be applied to the second input of each discriminator 6, 7 and 8. In the preferred embodiment, the wave forms of FIG. 4 are utilized. The wave forms of FIGS. 2 and 3, however, represent components of the wave forms of FIG. 4 which may be used in simpler embodiments to provide operation in accordance with the present invention. For simplicity of description, each of the wave forms in FIGS. 2, 3 and 4 are shown as being centered about a zero axis and having a positive and negative excursion. The valve each wave form reaches above the zero voltage level axis is referred to as the positive value, and the value below the zero axis each wave form reaches is referred to as the negative value of the particular wave form. However, it should be realized that such levels are arbitrary. The portion of each of the wave forms of FIGS. 2, 3 and 4 above the zero axis is referred to as the "positive portion of the wave form," and the portion below the zero axis is referred to as the "negative portion" of the wave form. These terms are only utilized for purposes of description with respect to FIG. 6 below.

Referring now to FIG. 2, a first improvement of the present invention is illustrated. A first of the two step waves applied to a discriminator is a quasi square wave. A quasi square wave is a square wave having a zero dwell intermediate its positive and negative excursions. By applying the wave forms of FIG. 2 to a discriminator, an output waveform is provided at an output terminal which is represented by the solid line waveform of FIG. 5. This waveform, which may be referred to as a trapezoidal waveform has no third harmonics provided the zero dwell is 60°. The amplitude of the other harmonics may be expressed as $(1/n)^2$ times the amplitude of the fundamental waveform, where n is the number of the harmonic. The waveform of FIG. 2*a* may conveniently have a zero dwell having a width of 60°. Such a value is partially convenient in conjunction with the division circuitry included in the frequency dividers 3, 4 and 5 of FIG. 1 in providing a three phase output.

Referring now to FIG. 3, a further improvement in accordance with the present invention is provided by having both inputs to a discriminator comprised quasi waves as illustrated in FIGS. 3*a* and *b*. In accordance with the present invention, it has been discovered by providing a 31° zero dwell in the wave form of FIG. 3*a*, the amplitude of all harmonics produced is reduced below 1 percent of the amplitude of the fundamental frequency output. The wave form obtained by applying the inputs of FIGS. 3*a* and *b* to a discriminator is illustrated by the dashed waveform of FIG. 5. This waveform may be characterized by the trapezoidal wave having its corners depressed by a new slope.

A further refinement in accordance with the present invention is illustrated by FIGS. 4*a* and 6 which illustrate another form of inputs to a discriminator in the circuit of FIG. 1. In the waveform of FIG. 4*b*, high frequency switching is provided for a time period on either side of each zero dwell such that the value of the waveform alternates between that of its positive or negative excursion and zero. As illustrated by the dotted waveform in FIG. 5, the corners of the dashed waveform are rounded, and a substantially sinusoidal output is provided. Such a waveform has harmonics having an amplitude of less than 0.3 percent of the amplitude of the fundamental output.

Referring now to FIG. 6, a preferred embodiment of the reference wave generator of FIG. 1 is illustrated in schematic form. FIG. 6 consists of FIGS. 6–I and 6–II combined as indicated therein. In the circuit of FIG. 6, the input wave forms of FIG. 4 are produced by logic circuits capable of assuming first and second states, which may be referred to as a "positive" state and a "zero" state. The wave forms of FIG. 4, however, have three states positive, zero and "negative". In order to provide three-state reference waves from two-state devices, first and second components of the waves illustrated in FIGS. 4*a* and *b* are produced separately, and the latter is subtracted from the former. This operation is performed separately for each of the three output phases, which are referred to as phase A, phase B and phase C.

In FIG. 6, the same reference numerals are used to denote portions of the circuit corresponding to those of FIG. 1. Once again, the clock source 1 is coupled to a first frequency divider to provide outputs to discriminators 6, 7 and 8. The clock source 1 is also coupled to the frequency dividers 3, 4 and 5. In the circuit of FIG. 6, the components for the A, B and C phase waveforms are generated separately and combined respectively in the discriminators 6, 7 and 8.

The basic building blocks of the circuit of FIG. 6 are the J–K flip-flop operating in accordance with the truth table of FIG. 6*a* and the NAND gate operating in accordance with the truth table of FIG. 6*b*. The 1 state corresponds to a zero voltage level of FIG. 4, and a 0 state corresponds to the positive level of FIG. 4. These choices are arbitrary and in other forms of the invention, 1 state and the 0 state may correspond to different voltage levels. In FIG. 6, where no inputs are shown to the J and K terminals, voltage level corresponding to 1 are applied thereto.

Figure 7:
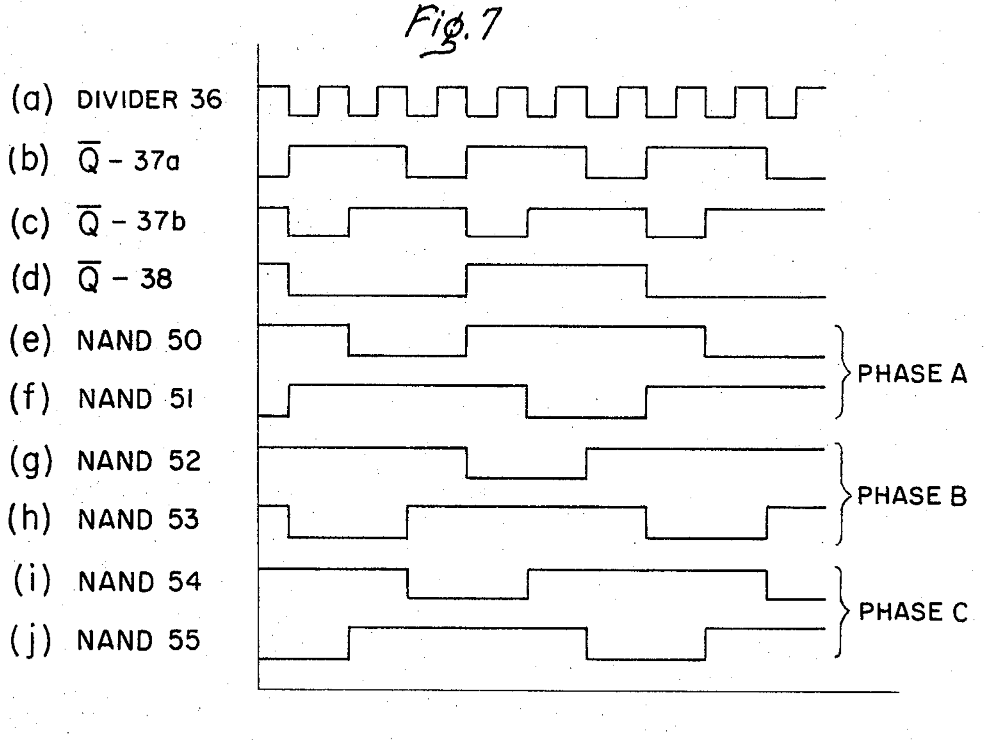
FIGS. 7 and 8 are waveform charts useful in understanding the operation of the circuit of FIG. 6.
Figure 8:
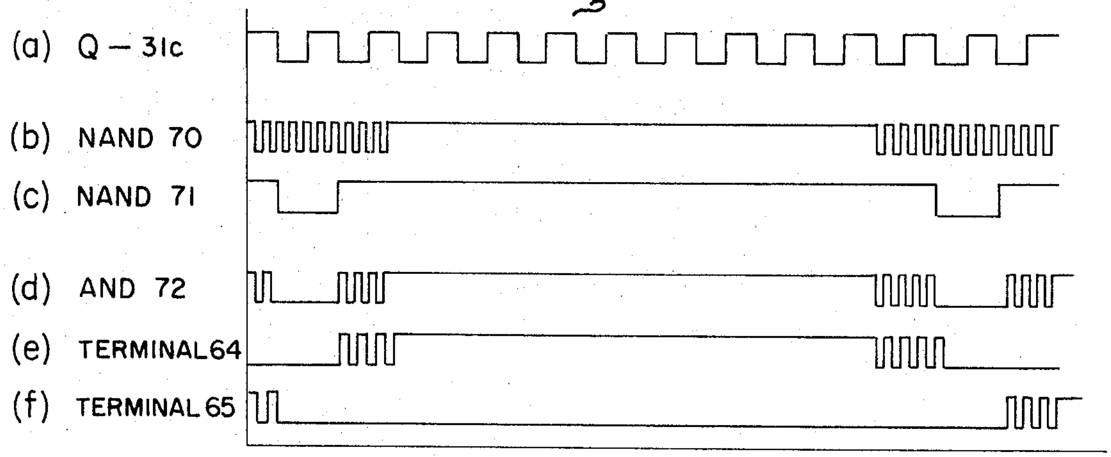

The path providing the divisor N1 of 176 comprises serially connected frequency dividers 31, 32 and 33 respectively providing divisors of 8, 11 and 2. The divide by 174 path comprises frequency dividers 36, 37 and 38 serially coupled and respectively providing divisors of 29, 3 and 2. Outputs of the divide by 174 and divide by 176 paths are connected to the discriminators 6, 7 and 8. The discriminator 6 provides an A output phase, the discriminator 7 provides a B output phase, and the discriminator 8 provides a C output phase. Each discriminator is constructed in the same manner, and the suffix A, B or C is utilized to denote components of the discriminator 6, 7 and 8 respectively. Each discriminator includes NAND gates 41, 42, 43 and 44. The NAND gates 41 and 42 provide an output equal to the in-phase components of the waveforms of FIGS. 4*a* and *b* at a terminal 45. The NAND gates 43 and 44 provide an output equal to the out-of-phase components of the same waves at a terminal 46. The terminals 45 and 46 are respectively connected to first and second inputs of an operational amplifier 48, one input of which is an inverting input in order to perform subtraction. The operational amplifier 48 is connected in a conventional subtracting and integrating circuit 49. In this manner, the previously described output equal to the in-phase voltage minus the out-of-phase voltage is provided. The outputs of the circuits 49A, 49B and 49C are respectively coupled to the output terminals 9, 10 and 11. The waveforms according to FIG. 4 are generated separately for each phase A, B and C in the following manner. FIG. 7 is illustrative of waveforms utilized to generate the waveform of FIG. 4*a*, and FIG. 8 is illustrative of waveforms utilized to generate the waveform of FIG. 4*b*. Each of the discriminators 6, 7 and 8 includes a power source 17 connected to the circuit 49 for selecting the amplitude of the reference waves appearing respectively in the output terminals 9, 10 and 11.

The input wave forms are provided in the following manner. Clock pulses are coupled from the clock source 1 to the divide by 29 frequency divider 36 providing the output illustrated in FIG. 7*a*. The output of the divider 36 is coupled to the divide by three divider 37. The divide by three divider 37 consists of first and second J-K flip-flops 37*a* and 37*b*. The output of the frequency divider 36 is connected to the clock terminal of the flip-flop 37*a* and the clock terminal of the flip-flop 37*b*. The Q and $\overline{Q}$ outputs of the flip-flop 37*a* are respectively connected to the J and K terminals of the flip-flop 37*b*. The $\overline{Q}$ output of the flip-flop 37*b* is connected to the J input of the flip-flop 37*a*. The k terminals and reset terminals of the flip-flops 37*a* and 37*b* are connected to a source (not shown) providing a 1 level. Operating in accordance with the truth table of FIG. 6*a*, an output wave form illustrated in FIG. 7*b* is provided at the $\overline{Q}$ terminal of the flip-flop 37*a*, and the wave form of FIG. 7*c* is provided at the $\overline{Q}$ terminal of the flip-flop 37*b*. In FIG. 7, the convention is utilized that a negative going excursion represent the initiation of a pulse. The output wave forms of FIG. 7*b* and *c* may be described as having an output which is characterized as "on" for one count of the divider 36 and "off" for two counts of the divider 36. The output of the flip-flop 37*b* may be characterized as leading the output of the flip-flop 37*a* by 120°. (It should be noted that here and below, phase displacement is measured with respect to one cycle of the particular wave being discussed.)

The outputs in FIG. 7*b* and *c* are the wave forms on which the production of the three phases A, B and C are based. The $\overline{Q}$ output of the flip-flop 37*b* is connected to the clock terminal of the divide by two divider 38, which also comprises J-K flip-flop. The output at the $\overline{Q}$ terminal of the flip-flop 38 (FIG. 7*d*) is a symetrical square wave having a frequency one-half that of the input to the clock terminal. The output at the Q terminal of the flip-flop 38 is the complement of the wave form of the FIG. 7*d*. This output wave form is utilized to synchronize the production of half cycles of the input wave form to FIG. 4a.

In order to provide a wave form in accordance with FIG. 4*a* to the discriminator 6, the $\overline{Q}$ output of the flip-flop 37b FIG. 4c) is coupled to first inputs of NAND gates 50 and 51. Second inputs of the NAND gates 50 and 51 are respectively coupled to the Q and $\overline{Q}$ outputs of the divide by two divider 38. The output of the NAND gate 50 (FIG. 7*e*) is connected to first inputs of the NAND gates 41A and 43A. The output of the NAND gate 51 (FIG. 7*f*) is connected to first inputs of the NAND gates 42A and 44A. The outputs of the NAND gates 50 and 51 are phased displaced from each other by 180° have the same wave form shape as the outputs of the divide by three divider 37 at half the frequency. In this manner, first and second two-state wave forms are privided in the above-described manner for subtraction of one from the other to provide the three-state phase A output wave form corresponding to FIG. 4*a*. In addition, the operation of the NAND gates 41A–44A provides the reversal of polarity on alternate half cycles such that for one-half cycle of the output of the divider 38, the wave form of FIG. 7*e* is subtracted from that of FIG. 7*f* and vice versa for the other half cycle. The components of the phase b wave form according to FIG. 4*a* are provided to the discriminator 7 in a similar manner. The $\overline{Q}$ output of the flip-flop 37*a* (FIG. 7*b*) is coupled to first inputs of NAND gates 52 and 53. Second inputs of the NAND gates 52 and 53 are respectively coupled to the $\overline{Q}$ and Q outputs of the NAND gates 52 (FIG. 7*g*) and 73 (FIG. 7*h*) comprise wave forms equal to the outputs of the NAND gates 50 and 51 respectively but phase displaced therefrom by 120°.

The inputs for the C phase corresponding to the wave form of FIG. 4*a* are provided from NAND gates 54 and 55. The NAND gate 54 has a first input coupled to the output of the NAND gate 51 and a second input connected to the output of the NAND gate 53. The NAND gate 55 has a first input connected to the output of the NAND gate 50 and a second input connected to the output of the NAND gate 52. The output of the NAND gate 54 (FIG. 7i) which is connected to the gates 41*c* and 43*c*, is equal to the output of the NAND gate 50, but phase displaced therefrom by 240°. Similarly, the output of the NAND gate 55 (FIG. 7j) which is coupled to the NAND gates 42C and 44C, is equal to the output of the NAND gate 51 (FIG. 7*f*) but phase displaced therefrom by 240°.

The wave forms for phases A, B and C corresponding to the wave form of FIG. b are provided by the divide by 176 path comprising the dividers 31, 32 and 33. The frequency divider 31 consists of serially connected J–K flip-flops 31*a*, 31*b* and 31*c*, which are each connected as divide by two dividers. The divider 31 provides an output equal to the clock frequency divided by eight, as illustrated in FIG. 8*a*. The divider 32 comprises serially connected J–K flip-flops 32*a*, 32*b*, 32*c* and 32*d*, as well as NAND gates 32*e* and 32*f* as well as a buffer 32*g*. These components are connected in a conventional manner to operate as a divide by 11 circuit. The output of the divider 32 is provided at the output of the NAND gate 32*f* and coupled to a J–K flip-flop comprising the divide by two divider 33. The Q output of the divider 33 may be characterized as on for 180° and off for 18°.

The Q output of the divider 33 is connected to a buffer 60, and the Q output of the divider 33 is connected to a buffer 62. The buffer 60 output is connected to a terminal 64 which is connected to the gates 41A, B and C and 44A, B and C of the discriminators 6, 7 and 8. In this manner a quasi square wave is obtained. In order to provide the high frequency input at either end of the zero dwell of the quasi square wave of FIG. 4*b*, a high frequency pulse is gated into the input wave. To this end, first and second NAND gates 70 and 71 are provided having their outputs connected in "wired-OR" configuration. This connection is represented by an AND gate 72. The first input of the NAND gate 70 is connected to the Q output of the J–K flip-flop 31*a*, and a second input of the NAND gate 70 is connected to the Q output of the J–K flip-flop 32*d*. The NANDING of these two inputs provides an output, as illustrated in FIG. 8*b*, consisting of a wave which is steady-state for one-half cycle of the output of the flip-flop 37*d* and a steady-state wave and consists of a pulse train at one-half the clock frequency for the other half cycle of the output of the flip-flop 37*d*. The NAND gate 71 has a first input connected to the output of the flip-flop 32*a* and a second input connected to the output of the flip-flop 32*d*. Consequently, the output of the NAND gate 71 (FIG. 8*c*) is equal to a square wave which is the complement of the divider 37*a* having a negative going excursion for the period of one-half cycle of the flip-flop 37*d*. The outputs of the NAND gates 70 and 71 are connected to the AND gate 72. The output of the AND gate 72 is represented in FIG. 8*d*. The wave form of FIG. 8d represents a wave form which is "superimposed" on the above described quasi square wave inputs to the discriminator 6, 7 and 8 in order to provide the high frequency wave form at either end of the zero dwell of the wave form of FIG. 4*b*.

In order to so couple the wave form of FIG. 8*d* to the discriminator 6, 7 and 8 the output of the AND gate 72 is coupled by a buffer 73 to buffers 61 and 63. The outputs of the buffers 60 and 61 are connected to the terminal 64 to provide the wave form of FIG. 8*e*, and the outputs of the buffers 62 and 63 are connected to a terminal 65 to provide the wave form of FIG. 8*f*.

The wave forms of FIGS. 8*e* and *f* may be characterized as first and second two-state components of a quasi square wave having high frequency portions centering around the off portion of the wave form. As stated above, the terminal 64 is connected to inputs of the NAND gates 41 and 44A, B and C. The terminal 65 is connected to inputs of the NAND gates 42 and 43A, B and C. In this manner, inputs for the A, B and C phases corresponding to the wave form of FIG. 4*b* are provided to the discriminators 6, 7 and 8.

The width of the zero dwell of the wave form of FIG. 4*b* is determined by the division performed by the dividers 31, 32 and 33. It has been discovered a significant reduction in output harmonics is achieved when the zero dwell is between 20° and 40°. The portion of the input wave forms to the discriminators 6, 7 and 8 during which the high frequency switching appears and the extent to which the high frequency switching overlaps the zero dwell and zero or one level of the input wave form is determined by the synchronization provided by the divider 32. By connecting the NAND gates 70 and 71 to different J–K flip-flop outputs, the width of the high frequency switching portion of the waves corresponding to FIG. 4*c* may be changed.

Of course, conventional square wave generator outputs may be utilized to provide the wave forms provided herein. Also, it is possible to see the day when three-state logic circuits will be made. The present embodiment, however, is desirable in that it uses digital devices susceptible of microcircuit construction or construction by readily available discrete components. Those skilled in the art should be able to utilize other conventional components to provide a circuit in accordance with the present invention according to the above-teachings.

What is claimed as new and desired to be secured by Letters Patent of the United States is:

1. A reference wave generator comprising, in combination:

a. a source of clock pulses;

b. first and second step wave generators for producing step waves of different frequencies, at least one of which produces a quasi-square wave having a positive excursion and a negative excursion and a period of zero dwell between said positive and negative excursions, both said first and second wave generators being coupled to and synchronized by said clock source and;

c. a discriminator couple to the outputs of said first and second step wave generators for providing an output equal to the in-phase voltage minus the out-of-phase voltage of the outputs of said first and second step wave generators, whereby said discriminator provides an output whose average value is represented by a continuous wave of low harmonic content having a frequency equal to the difference between the frequencies of said first and second step wave generators.

2. A reference wave generator according to claim 1 in which said first step wave generator comprises a square wave generator and said second step wave generator comprises a quasi-square wave generator whereby the output from said discriminator is a continuous trapezoidal wave form.

3. A reference wave generator according to claim 2 further comprising smoothing means coupled to the output of said discriminator, said smoothing means providing an output wave having a frequency equal to the difference of the frequencies provided by said square wave generator and said quasi-square wave generator.

4. A system according to claim 2 in which said first step wave generator provides a quasi-square wave having a zero-dwell of between 20° and 40°.

5. A system according to claim 4 in which said first step wave generator further comprises means for superimposing a signal on the output of said first step wave generator for a period of 20° to 40° on either side of the zero-dwell and having a frequency at least 10 times higher than the output frequency of said first reference wave generators for producing a substantially sinusoidal output wave from said discriminator.

6. A reference wave generator according to claim 1 in which said second step wave generator includes phase shifting means for providing additional outputs such that said second step wave generator provides N step waves, each phase displaced from the next by 360/N° and in which said discriminator discriminates each of said waves against a output of said first step wave generator and provides N outputs.

7. A reference wave generator according to claim 6 in which said phase shifting means comprise logic circuits.

8. A reference wave generator according to claim 7 in which said first step wave generator comprises a sqaure wave generator and said second step wave generator comprises a quasi-square wave generator.

9. A reference wave generator according to claim 8 further comprising smoothing means coupled to the output of said discriminator, said smoothing means providing an output wave having a frequency equal to the difference of the frequencies provided by said square wave generator and said quasi-square wave generator.

10. A reference wave generator according to claim 1 in which said first step wave generator comprises a quasi-square wave generator and said second step wave generator comprises a quasi-square wave generator whereby the output wave form is made substantially sinusoidal.

* * * * *